United States Patent
Luo et al.

(10) Patent No.: US 6,654,506 B1
(45) Date of Patent: *Nov. 25, 2003

(54) METHOD FOR AUTOMATICALLY CREATING CROPPED AND ZOOMED VERSIONS OF PHOTOGRAPHIC IMAGES

(75) Inventors: Jiebo Luo, Rochester, NY (US); Robert T. Gray, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/490,915

(22) Filed: Jan. 25, 2000

(51) Int. Cl.[7] ............................ G06K 9/20; H04N 1/387
(52) U.S. Cl. ...................... 382/282; 382/173; 358/453; 345/620
(58) Field of Search ................................. 382/291, 173, 382/180, 225, 282; 345/620–628; 358/453

(56) References Cited

U.S. PATENT DOCUMENTS

| | | | | |
|---|---|---|---|---|
| 5,640,468 A | * | 6/1997 | Hsu ........................... 382/190 |
| 5,781,665 A | * | 7/1998 | Cullen et al. ............... 382/254 |
| 5,880,858 A | * | 3/1999 | Jin ............................. 358/487 |
| 5,978,519 A | | 11/1999 | Bollman et al. ............ 382/282 |
| 6,091,841 A | * | 7/2000 | Rogers et al. .............. 382/132 |
| 6,282,317 B1 | * | 8/2001 | Luo et al. ................... 382/203 |
| 6,335,985 B1 | * | 1/2002 | Sambonsugi et al. ....... 382/190 |
| 6,430,320 B1 | * | 8/2002 | Jia et al. .................... 382/289 |
| 6,434,271 B1 | * | 8/2002 | Christian et al. ........... 382/194 |
| 6,456,732 B1 | * | 9/2002 | Kimbell et al. ............. 382/112 |

OTHER PUBLICATIONS

U.S. patent application Ser. No. 09/223,860, Luo et al., filed Dec. 31, 1998.

* cited by examiner

Primary Examiner—Bhavesh M. Mehta
Assistant Examiner—Aaron Carter
(74) Attorney, Agent, or Firm—Raymond L. Owens

(57) ABSTRACT

A method and computer program/system for cropping a digital image includes inputting a belief map of a photographic image, (a belief value at a location in the belief map indicates an importance of a photographic subject at the same location in the photographic image), selecting a zoom factor and a crop window, clustering regions of the belief map to identify background portions, secondary portions and main portions, positioning the crop window such that the crop window is centered around a main portion having a highest belief value, moving the crop window such that the crop window is included completely within the image, moving the crop window such that a sum of belief values is at a maximum, and cropping the image according to the crop window.

48 Claims, 10 Drawing Sheets

METHOD FOR AUTOMATICALLY CREATING CROPPED AND ZOOMED VERSIONS OF PHOTOGRAPHIC IMAGES

BACKGROUND OF THE INVENTION

1. Field of the Invention

The invention relates generally to the field of digital image processing and digital image understanding and more particularly to a process and system for automatically creating cropped and zoomed versions of photographic images.

2. Description of the Related Art

For many decades, traditional commercial photo-finishing systems have placed limits on the features offered to consumers to promote mass production. Among those features that are unavailable conventionally, zooming and cropping have been identified by both consumers and photofinishers as extremely useful additional features that could potentially improve the quality of the finished photos and the subsequent picture sharing experiences. With the advent of, and rapid advances in digital imaging, many of the technical barriers that existed in traditional photography no longer stand insurmountable.

Hybrid and digital photography provide the ability to crop undesirable content from a picture, and magnify or zoom the desired content to fill the entire photographic print. In spite of the fact that some traditional cameras with zoom capability provide consumers greater control over composing the desired scene content, studies have found that photographers may still wish to perform a certain amount of cropping and zooming when viewing the finished photograph at a later time. Imprecise viewfinders of many point-and-shoot cameras, as well as simply second-guessing their initial compositions, are factors in the desirability of zoom and crop. In addition, it maybe desirable to use some other regular border templates such as ovals, heart shapes, squares, etc. In another scenario, some people commonly referred to as "scrapbookers" tend to perform more aggressive crop in making a scrapbook, e.g., cutting along the boundary of objects.

There are significant differences in objectives and behaviors between these two types of cropping, namely albummaking and scrapbook making, with the latter more difficult to understand and summarize. The invention described below performs automatic zooming and cropping for making photographic prints. One customer focus group study indicated that it would be beneficial to provide customers a double set of prints—one regular and one zoom. Moreover, it is preferred that the cropping and zooming be done automatically. Most customers do not want to think about how the zooming and cropping is being done as long as the content and quality (e.g., sharpness) of the cropped and zoomed pictures are acceptable.

There has been little research on automatic zoom and crop due to the apparent difficulty involved in performing such a task. None of the known conventional image manipulation software uses scene content in determining the automatic crop amount. For example, a program entitles "XV", a freeware package developed by John Bradley at University of Pennsylvania, USA (Department of Computer and Information Science), provides an "autocrop" function for manipulating images and operates in the following way:

1. The program examines a border line of an image, in all of the four directions, namely from the top, bottom, left and right sides;

2. The program checks the variation within the line. In grayscale images, a line has to be completely uniform to be cropped. In color images, both the spatial correlation and spectral correlation have to be low, except for a small percentage of pixels, for the line to be qualified for cropping. In other words, a line will not be cropped if it contains a significant amount of variation;

3. If a line.along one dimension passes the criterion, the next line (row or column) inward is then examined; and 4. The final cropped image is determined when the above recursive process stops.

This program essentially tries to remove relatively homogeneous margins around the borders of an image. It does not examine the overall content of the image. In practice, the XV program is effective in cropping out the dark border generated due to imprecise alignment during the scanning process. However, disastrous results can often be produced due to the apparent lack of scene understanding. In some extreme cases, the entire image can be cropped.

Another conventional system, described by Bollman et al. in U.S. Pat. No. 5,978,519 (incorporated herein by reference), provides a method for cropping images based upon the different intensity levels within the image. With this system, an image to be cropped is scaled down to a grid and divided into non-overlapping blocks. The mean and variance of intensity levels are calculated for each block. Based on the distribution of variances in the blocks, a threshold is selected for the variance. All blocks with a variance higher than the threshold variance are selected as regions of interest. The regions of interest are then cropped to a bounding rectangle. However, such a system is only effective when uncropped images contain regions where intensity levels are uniform and other regions where intensity levels vary considerably. The effectiveness of such a system is expected to be comparable to that of the XV program. The difference is that the XV program examines the image in a line by line fashion to identify uniform areas, while U.S. Pat. No. 5,978,519 examines the image in a block by block fashion to identify uniform areas. In summary, both techniques cannot deal with images with non-uniform background.

Problems to be Solved by the Invention

The major drawback of conventional techniques is that they do not provide a system for having photographs automatically cropped or zoomed based upon the main subject in the image except, using expensive manual techniques.

SUMMARY OF THE INVENTION

The invention comprises a method and computer program for cropping a digital image that includes inputting a belief map of an image, selecting a zoom factor and a crop window, clustering regions of the belief map to identify background portions, secondary portions and main portions, positioning the crop window such that the crop window is centered around a main portion having a highest belief value, moving the crop window such that the crop window is included completely within the image, moving the crop window such that a sum of belief values is at a maximum, and cropping the image according to the crop window.

The invention moves the crop window such that the crop window includes all of the main region having the highest belief value, and/or includes a buffer (margin) around the main region having the highest belief value. The clustering includes setting the background portions to a zero belief value.

The invention can also repeat the positioning process and the moving processes with a rotated image and determine if the rotated image produces a higher sum of beliefs. Similarly, the invention can repeat the processes with a second zoom factor and a second crop window and determine if the second zoom factor and the second crop window produce a higher sum of beliefs than of the first zoom factor and the first crop window (and a lower sum of belief outside the crop window).

In another embodiment the invention is a system for cropping an image that includes an input for receiving a belief map of an image, a selector choosing a crop window, a window mover positioning the crop window such that the crop window is centered around a portion of the belief map having a highest belief value, and a cropper modifying the image according to the crop window.

The invention may include a second selector selecting a zoom factor and a comparator clustering regions of the belief map into belief categories. The comparator sets portions of the belief map having a lowest belief value to a zero belief value.

The window mover moves the crop window such that the crop window is included completely within the image, such that a sum of belief values is at a maximum, such that the crop window includes all of the region having the highest belief value, or such that the crop window includes a buffer around the region having the highest belief value. Also, the window mover may repeat the moving processes with a rotated image and determine if the rotated image produces a higher sum of beliefs or repeat the positioning process and the moving processes with a rotated image and determine if the rotated image produces a higher sum of beliefs. Similarly, the selector, window mover and cropper can repeat the processes with a second crop window and determine if the second crop window produces a higher sum of beliefs.

Advantages of the Invention

One advantage of the invention lies in the ability to automatically crop and zoom photographic images based upon the scene contents. With the invention of the main subject of the image is identified and the cropping and zooming is performed around this main subject. Therefore, the invention produces high-quality zoomed or crops images automatically, regardless whether the background is uniform or not.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
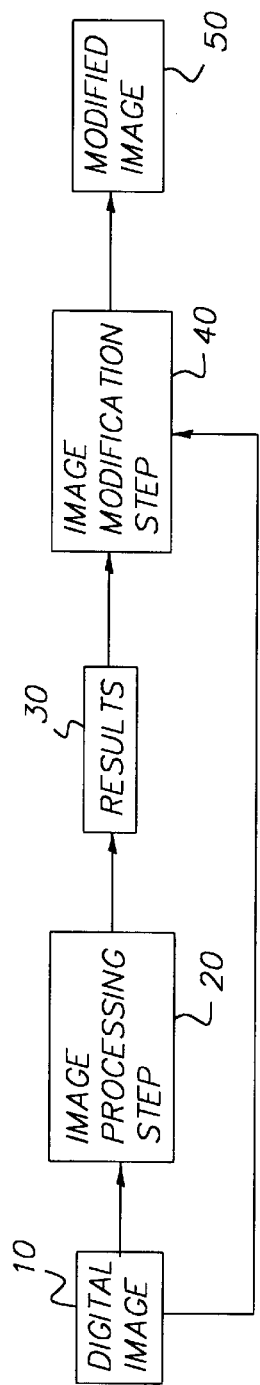
FIG. 1 is a schematic architectural diagram of an embodiment of the invention.

The invention automatically zooms and crops digital images according to an analysis of the main subject in the scene. Previously, a system for detecting main subjects (e.g., main subject detection or "MSD") in a consumer-type photographic image from the perspective of a third-party observer has been developed and is described in U.S. patent application Ser. No. 09/223,860, filed on Dec. 31, 1998 in the names of Jiebo Luo, Stephen Etz and Amit Singhal, and entitled "Method for Automatic Determination of Main Subjects in Photographic Images" incorporated herein by reference. Main subject detection provides a measure of saliency or relative importance for different regions that are associated with different subjects in an image. Main subject detection enables a discriminative treatment of the scene content for a number of applications related to consumer photographic images, including automatic crop and zoom.

Conventional wisdom in the field of computer vision, which reflects how a human observer would perform such tasks as main subject detection and cropping, calls for a problem-solving path via object recognition and scene content determination according to the semantic meaning of recognized objects. However, generic object recognition remains a largely unsolved problem despite decades of effort from academia and industry.

The MSD system is built upon mostly low-level vision features with semantic information integrated whenever available. This MSD system has a number of sub-tasks, including region segmentation, perceptual grouping, feature extraction, and probabilistic and semantic reasoning. In particular, a large number of features are extracted for each segmented region in the image to represent a wide variety of visual saliency properties, which are then input into a tunable, extensible probability network to generate a belief map containing a continuum of values.

Using MSD, regions that belong to the main subject are generally differentiated from the background clutter in the image. Thus, automatic zoom and crop becomes possible. Automatic zoom and crop is a nontrivial operation that was considered impossible for unconstrained images, which do not necessarily contain uniform background, without a certain amount of scene understanding. In the absence of content-driven cropping, conventional systems have concentrated on simply using a centered crop at a fixed zoom (magnification) factor, or removing the uniform background touching the image borders. The centered crop has been found unappealing to customers.

The output of MSD used by the invention is a list of segmented regions ranked in descending order of their likelihood (or belief) as potential main subjects for a generic or specific application. This list can be readily converted into a map in which the brightness of a region is proportional to the main subject belief of the region. Therefore, this map can be called a main subject "belief" map. This "belief" map is more than a binary map that only indicates location of the determined main subject. The associated likelihood is also attached to each region so that regions with large values correspond to regions with high confidence or belief of being part of the main subject.

To some extent, this belief map reflects the inherent uncertainty for humans to perform such a task as MSD because different observers may disagree on certain subject matter while agreeing on other subject matter in terms of main subjects. However, a binary decision, when desired, can be readily obtained by using an appropriate threshold on the belief map. Moreover, the belief information may be very useful for downstream applications. For example, different weighting factors can be assigned to different regions (subject matters) in determining the amount of crop.

For determination of crop, the invention uses the main subject belief map instead of a binarized version of the map to avoid making a bad cropping decision that is irreversible. Furthermore, using the continuous values of the main subject beliefs helps trade-off different regions under the constraints encountered in cropping. A binary decision on what to include and what not to include, once made, leaves little room for trade-off. For example, if the main subject region is smaller than the cropping window, the only reasonable choice, given a binary main subject map, is to leave equal amounts of margin around the main subject region. On the other hand, secondary main subjects are indicated by lower belief values in the main subject belief map, and can be included according to a descending order of belief values once the main subject of highest belief values are included. Moreover, if an undesirable binary decision on what to include/exclude is made, there is no recourse to correct the mistake. Consequently, the cropping result becomes sensitive to the threshold used to obtain the binary decision. With a continuous-valued main subject belief map, every region or object is associated with a likelihood of being included or a belief in its being included.

To reduce the degrees of freedom in determining the amount of crop, in particular for making photographic prints, in one embodiment, the invention restricts the set of allowable zoom factors {e.g., to 1.5x, 2x, 3x, 4x, etc.}. This is based on the findings in the customer focus studies. Although one ordinarily skilled in the art would recognize that the invention can be used with any zoom factor. In one example, the default zoom factor is set at 1.5x.

The subject matter of the present invention relates to digital image understanding technology, which is understood to mean technology that digitally processes a digital image to recognize and thereby to assign useful meaning to human understandable objects, attributes or conditions and then to utilize the results obtained in the further processing of the digital image.

A block diagram of the overall sky detection system (e.g., the digital image understanding technology) is shown in FIG. 1. First, a digital image 10 is digitally processed 20. The results 30 obtained from processing step 20 are used along with the original digital image 10 in an image modification step 40 to produce a modified image 50.

Figure 2:
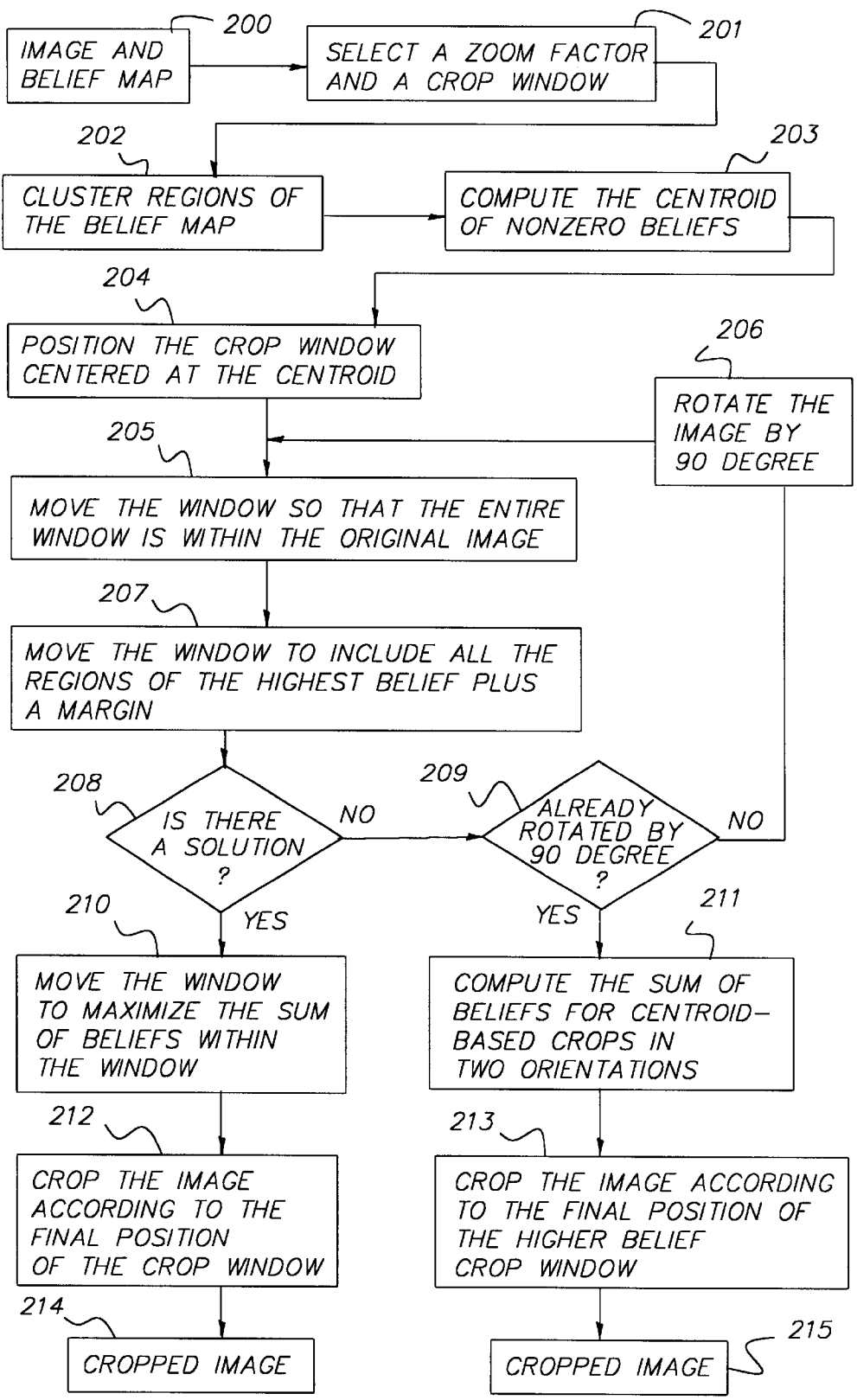
FIG. 2 is a schematic architectural diagram of an embodiment of the invention.

A more specific block diagram of the inventive sky detection process is shown in FIG. 2, which is discussed in relation to FIGS. 5–11. FIGS. 5–11 illustrate the inventive process being applied to an original image shown in FIG. 5.

In item 200, the image is input and a belief map is created using MSD. The invention selects a zoom factor (e.g. 1.5x) and a cropped window, as shown in item 201 (e.g. item 60 in FIG. 6). This zoom factor can be selected by an operator, or by an automatic method based directly on the main subject belief map (e.g., an estimate of the size of the main subject). The crop window is typically a rectangular window with a certain aspect ratio.

In item 202, regions of the belief map are clustered and the lowest belief cluster (e.g., the background belief) is set to zero using a predefined threshold. As discussed in greater detail below, sections of the image having a belief value below a certain threshold are considered background sections. In item 202 such sections are given a belief of zero for purposes of this embodiment of the invention.

Figure 6:
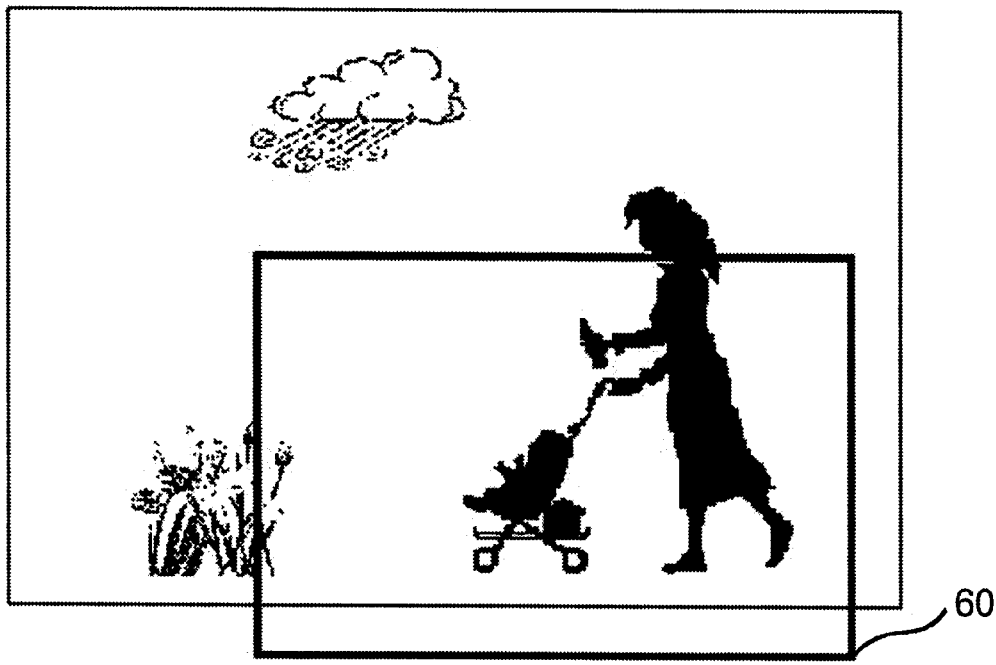
FIG. 6 illustrates the application of the invention to a simulated photograph.

Then, in item 203 the centroid, or center-of-mass, of nonzero beliefs are computed and, as shown in item 204, the crop window position is centered at the centroid, as shown in FIG. 6. More specifically, in FIG. 5 the subject having the highest belief in the belief map is the woman and the stroller. FIG. 6 illustrates that the centroid of this subject is approximately the top of the baby's head.

The centroid $(\hat{x},\hat{y})$ of a belief map is calculated using the following procedure:

$$\hat{x} = \sum_i x_i \text{bel}(x_i, y_i), \quad \hat{y} = \sum_i y_i \text{bel}(x_i, y_i),$$

where $x_i$ and $y_i$ denote that coordinates of a pixel in the belief map and $\text{bel}(x_i,y_i)$ represents the belief value at this pixel location.

Figure 7:
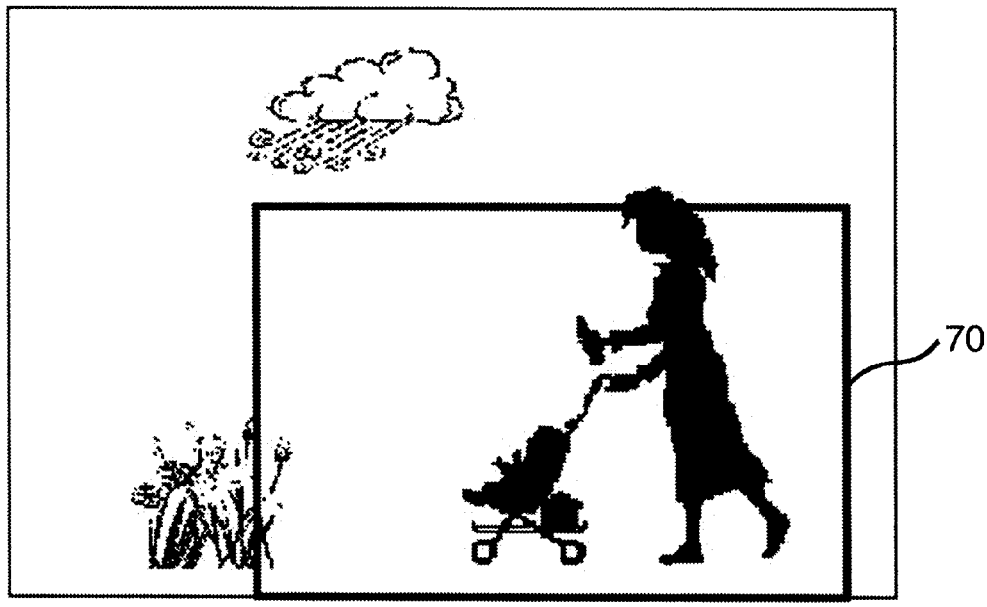
FIG. 7 illustrates the application of the invention to a simulated photograph.
Figure 8:
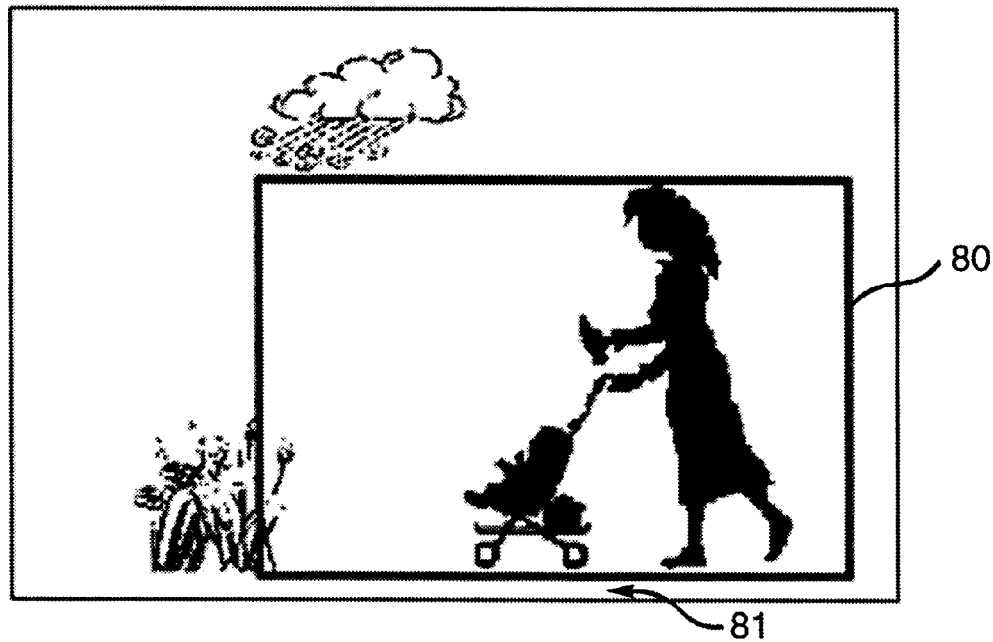
FIG. 8 illustrates the application of the invention to a simulated photograph.

The crop window is then moved so that the entire crop window is within the original image (e.g. item 205) as shown in FIG. 7. In item 207, the cropped window 50 is moved again so that all the regions of the highest belief subject are included within the cropped window and to create a margin of 81, as shown in FIG. 8. This process (e.g., 207) captures the entire subject of interest. Therefore, as shown in FIG. 8, the top of the woman's head is included in the cropped window. Compare this to FIG. 7 where the top of the woman's head was outside the cropped window.

Decision box 208 determines whether an acceptable solution has been found, i.e., whether it is possible to include at least the regions of the highest belief values in the cropping window.

Figure 9:
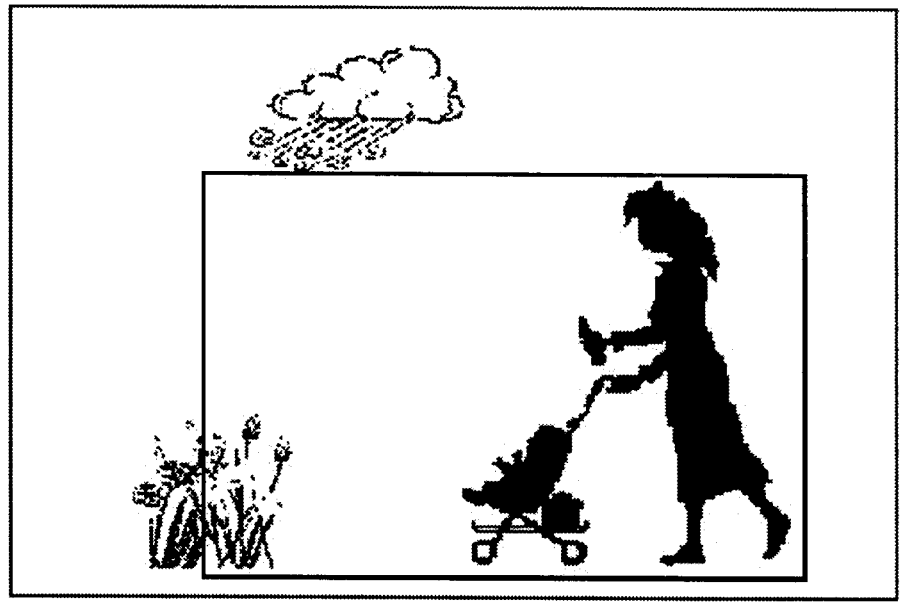
FIG. 9 illustrates the application of the invention to a simulated photograph.
Figure 10:
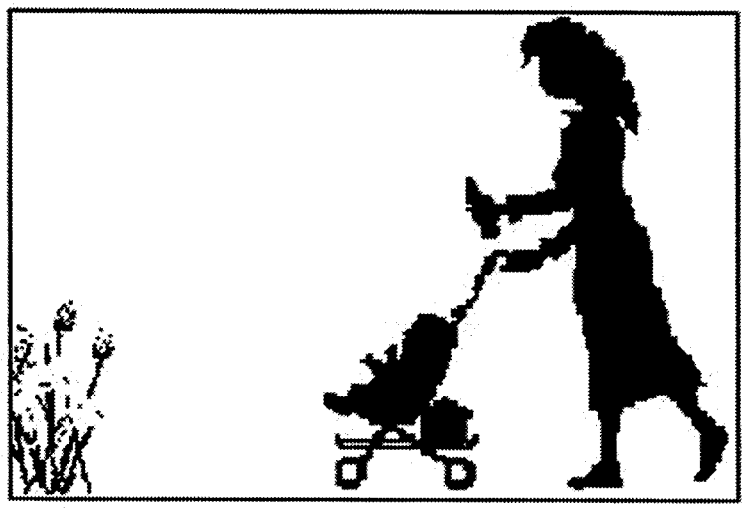
FIG. 10 illustrates the application of the invention to a simulated photograph.
Figure 11:
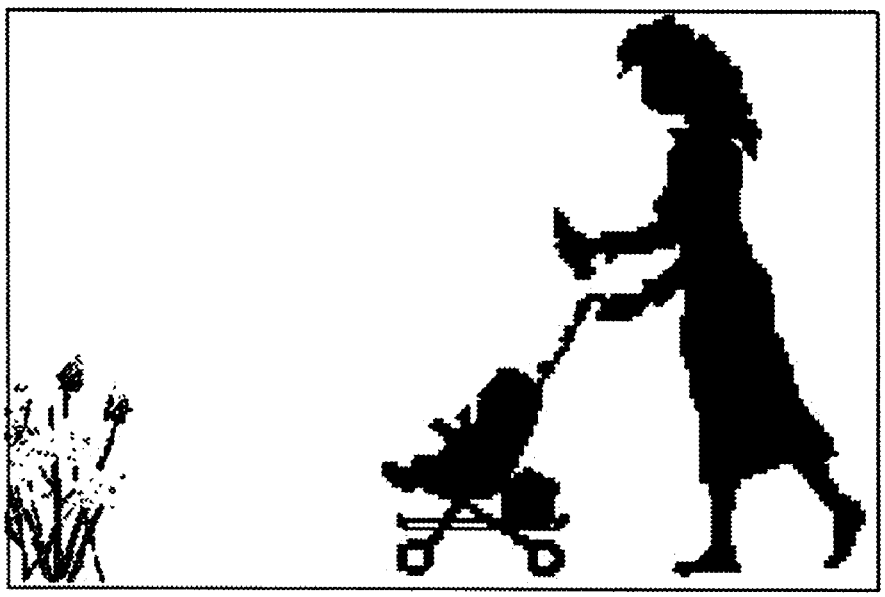
FIG. 11 illustrates the application of the invention to a simulated photograph.

If an acceptable solution exists, the window is again moved, as shown in item 210, to maximize the sum of beliefs within the window. This is shown in FIG. 9 where the secondary objects (e.g. flowers) are included within the cropped window to increase the sum of beliefs. The sum of beliefs for a cropping window is computed as follows.

$$\text{sum}(w) = \sum_{(x,y) \in w} \text{bel}(x, y),$$

where bel(x,y) represents the belief value at a given pixel location (x,y) within the cropping window w.

Provided that the primary subjects are included, moving the cropping window so that more of the secondary subjects are included would increase the sum of belief values within the cropping window. Recall that the primary subjects are indicated by the highest belief values and the secondary subjects are indicated by belief values lower than those of the primary subjects but higher than those of the background subjects. The goal is to find the cropping window that has the highest sum of belief values while ensuring that the primary subjects are completely included in the cropping window, i.e., $$\tilde{w} = \max_{w \in W} \text{sum}(w),$$

where W denotes the set of all possible cropping windows that satisfy all the aforementioned constraints (e.g., those that are completely within the uncropped image and those that encompass the entire primary subjects). Then, in item 212, the image is actually cropped according to the cropped window calculated above, producing the cropped image 214 shown in FIG. 10.

If decision box 208 does not produce an acceptable solution, the image is rotated (e.g., by 90 degrees), as shown in item 206, and the processing returns to item 205. At the second and greater pass through decision box 209, if the cropped window has already been rotated and there is still not an acceptable solution (from decision box 208), then the sum of the beliefs for the centroid-based cropped window are computed for both orientations (e.g., original and 90 degrees), as shown in item 211. Then, the image is cropped according to the final position of the higher belief of the two different orientations, as shown in item 213, producing the cropped image, as shown in item 215.

As would be known by one ordinarily skilled in the art given this disclosure, the image can be rotated at any number of potential angles (e.g. 45°, 180°, etc.) in item 206. Further, the decision box 209 can allow multiple passes of the process described in items 205, 207 at different rotation angles in an attempt to find the orientation having the highest sum of beliefs.

The simulated image example shown in FIGS. 5–11 illustrates the progress the invention makes as it moves through the process shown in FIG. 2. One could formulate the problem as a global exhaustive search for the best solution. The procedure used in the invention is considered a "greedy" searching approach and is certainly more efficient than conventional processes.

Figure 3:
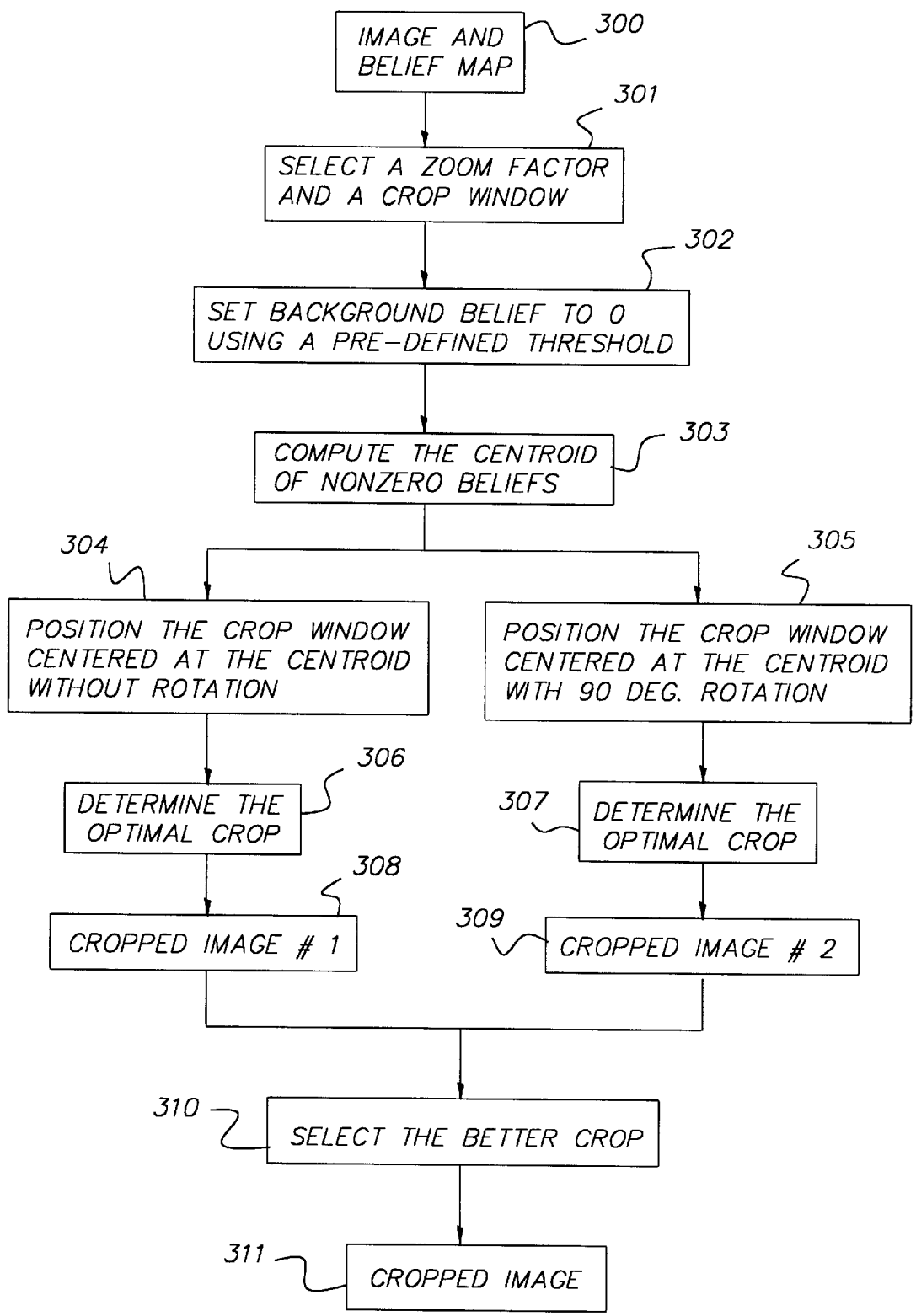
FIG. 3 is a schematic architectural diagram of an embodiment of the invention.
Figure 4:
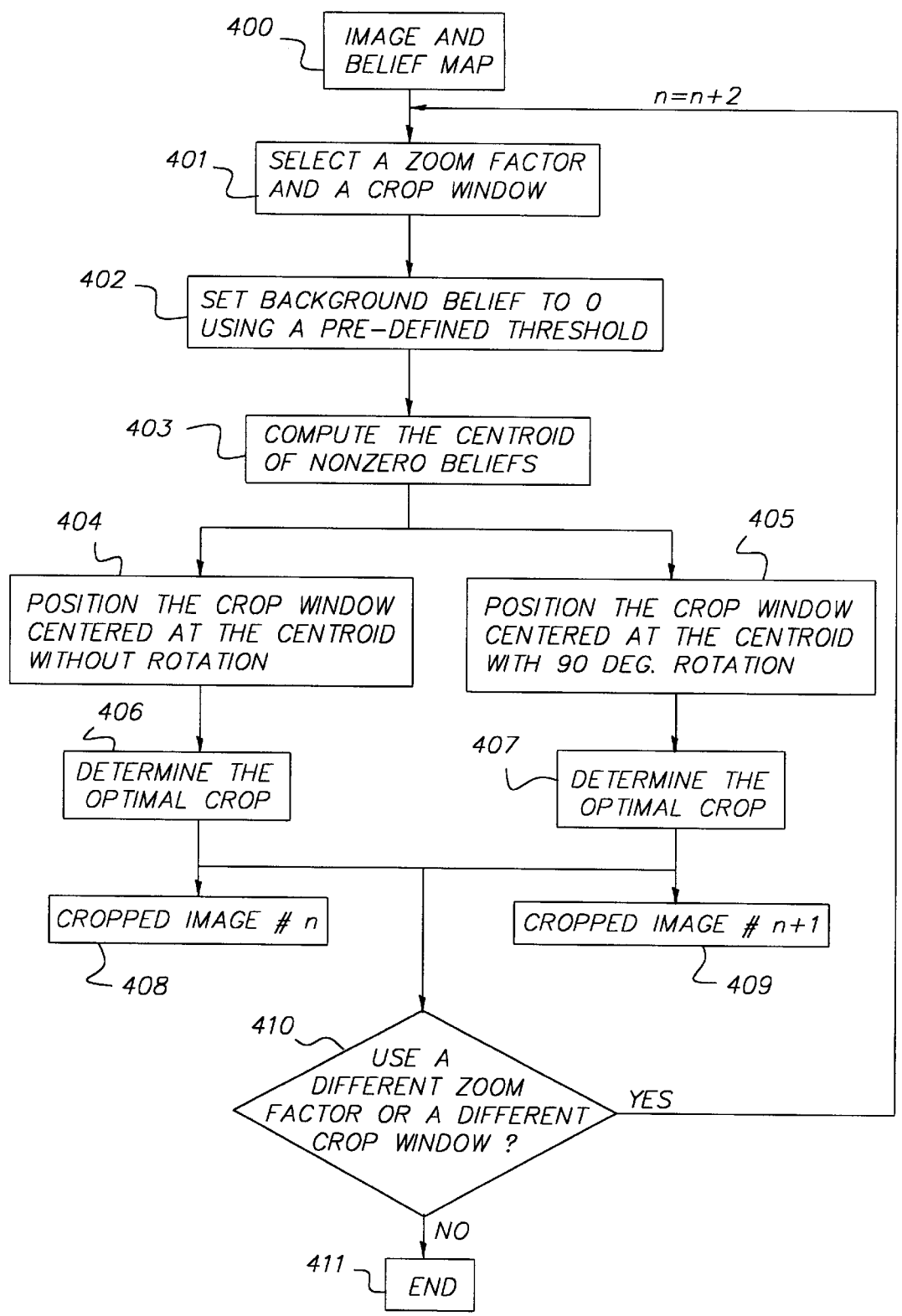
FIG. 4 is a schematic architectural diagram of an embodiment of the invention.
Figure 5:
FIG. 5 illustrates the application of the invention to a simulated photograph.

FIGS. 3 and 4 illustrate variations of the process shown in FIG. 2. FIG. 3 compares a landscape crop with a portrait crop, regardless of the initial (not necessarily the correct) picture orientation. The second variation in FIG. 4 creates a series of "ring-around" cropped versions with a zoom factor series (e.g., {1×, 1.5×, 2×, 3×, 4×}) for presentation to a human operator.

More specifically, in FIG. 3 items 300–303 are substantially identical to items 200–203 in FIG. 2. In item 304, the cropped window is positioned centered at the centroid without any rotation. Simultaneously, in a parallel processing step, the position of the cropped window is centered at the centroid with a rotation (e.g., 90 degree rotation). In items 306 and 307, the optimal cropped window is determined, as discussed above with respect to FIG. 2. This produces cropped images 308 and 309. In item 310 the better (e.g., higher sum of beliefs) of the two cropped images is selected and output as the cropped image 311.

Items 400–407 are substantially identical to items 300–307 discussed above. However, in the process shown in FIG. 4, decision box 410 observes the cropped images 408, 409 produced by the parallel processing in items 404–407 and determines whether an acceptable level has been attained. If the processing in item 410 determines that a different zoom factor or a different cropped window should be evaluated, processing returns to item 401. This process is repeated until an acceptable result is produced, ending in item 411.

The invention utilizes a built-in "k-means" clustering process to determine proper thresholds of MSD beliefs for each application. The invention also uses clustering, as discussed below to enhance the cropping process. In one preferred embodiment, it is sufficient to use three levels to quantize MSD beliefs, namely "high", "medium", and "low". As would be known by one ordinarily skilled in the art, the invention is not limited to simply three levels of classification, but instead can utilize a reasonable number of classification levels to reduce the (unnecessary) variation in the belief map. These three levels allow for the main subject (high), the background (low), and an intermediate level (medium) to capture secondary subjects, or uncertainty, or salient regions of background. Therefore, the invention can perform a k-means clustering with k=3 on the MSD belief map to "quantize" the beliefs. Consequently, the belief for each region is replaced by the mean belief of the cluster in that region. Note that a k-means clustering with k=2 essentially produces a binary map with two clusters, "high" and "low," which is undesirable for cropping based on earlier discussion.

There are two major advantages in performing such clustering or quantization. First, clustering helps background separation by grouping low-belief background regions together to form a uniformly low-belief (e.g., zero belief) background region. Second, clustering helps remove noise in belief ordering by grouping similar belief levels together. The centroiding operation does not need such quantization (nor should it be affected by the quantization). The main purpose of the quantization used here is to provide a threshold for the background.

The k-means clustering effectively performs a multi-level thresholding operation to the belief map. After clustering, two thresholds can be determined as follows:

$$\text{threshold}_{low}=(C_{low}+C_{med})/2, \text{threshold}_{high}=(C_{med}+V_{high})/2$$

where $\{C_{low}, C_{med}, C_{high}\}$ is the set of centroids (average belief values) for the three clusters, and $\text{threshold}_{low}$ and $\text{threshold}_{high}$ are the low and high thresholds, respectively.

Regions with belief values below the lower threshold are considered "background" and their belief values are set to zero in items 202, 302 and 402 discussed above. Regions with belief values above the higher threshold are considered part of the main subject and need to be included in their entirety, whenever possible. Regions with intermediate belief values (e.g., less than or equal to the higher threshold and greater than or equal to the lower threshold) are considered part of the "secondary subject" and will be included as a whole or partially, if possible, to maximize the sum of main subject belief retained by the cropping window. Note that the variance statistics on the three clusters can be used to set the thresholds more accurately to reflect cluster dispersions.

The invention initializes the k-means process by finding the maximum value $bel_{max}$ and minimum values $bel_{min}$ of the belief map, computing the average value $bel_{average}$ of the maximum and minimum values for item in the belief map, and setting the initial centroids (denoted by a superscript of 0) at these three values, i.e., $C_{low}^0 = bel_{min}, C_{med}^0 = bel_{med}, C_{high}^0 = bel_{max}$ Other ways of initialization may apply. For more about the k-means process, see Tou and Gonzalez, Pattern Recognition Principles, Reading MA: Addison-Wesley, 1974. For typical MSD belief maps, the k-means process usually converges in fewer than 10 iterations.

In applications where a zoom version of the cropped area is desired, there are two scenarios to consider. First, the zoom version effectively requires higher spatial resolution than the highest resolution of the original data. However, a visible loss of image sharpness is likely of concern in the situation. Second the zoom version effectively requires lower spatial resolution than the highest resolution of the original data. In both cases, the invention uses an interpolation process to resample the data in order to retain a maximum amount of image detail. In general, edge or detail-preserving image interpolation processes such as cubic-spline interpolation are preferred because they tend to preserve the detail and sharpness of the original image better.

Figure 13:
FIG. 13 illustrates the application of the invention to a consumer photograph.
Figure 14:
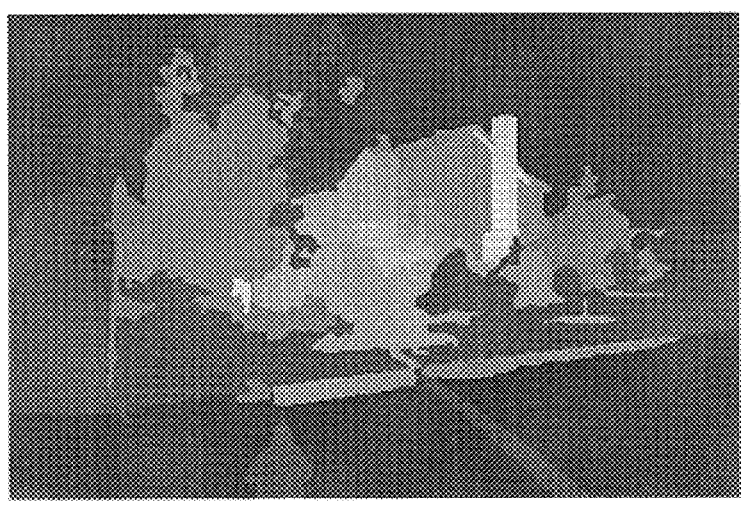
FIG. 14 illustrates the application of the invention to a consumer photograph.
Figure 15:
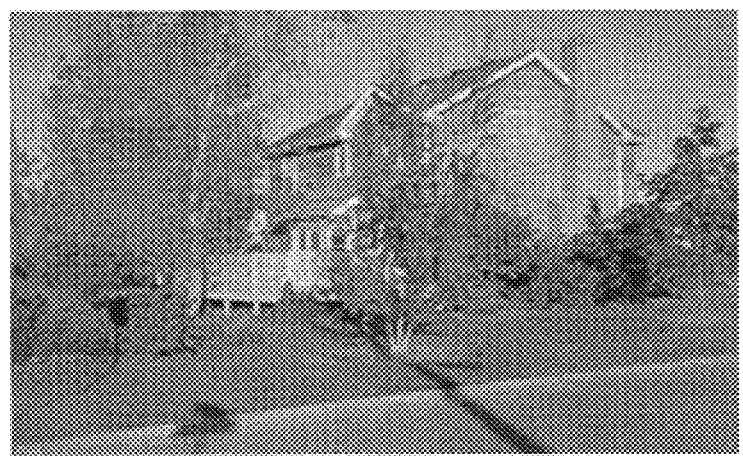
FIG. 15 illustrates the application of the invention to a consumer photograph.
Figure 16:
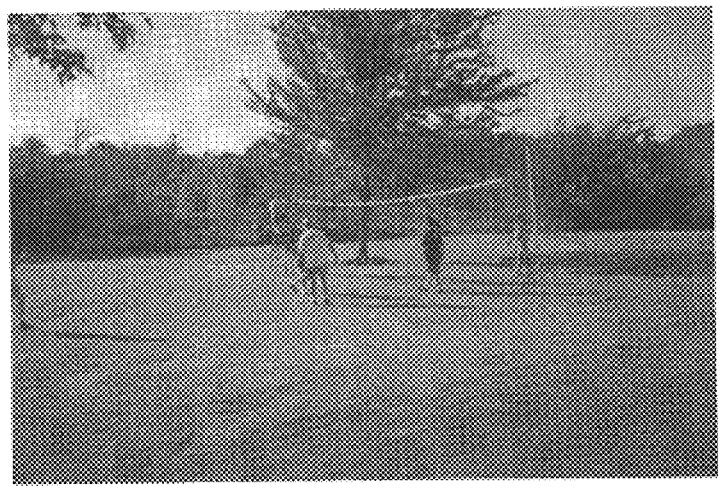
FIG. 16 illustrates the application of the invention to a consumer photograph.
Figure 17:
FIG. 17 illustrates the application of the invention to a consumer photograph.
Figure 18:
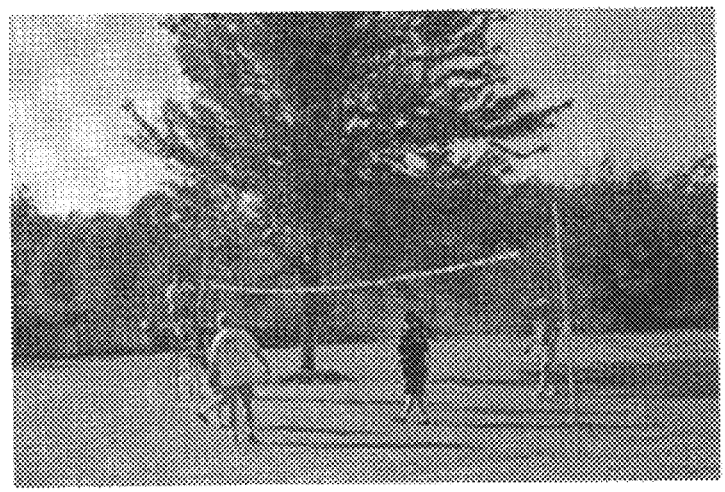
FIG. 18 illustrates the application of the invention to a consumer photograph.

Example consumer photographs and their various cropped versions are shown in pictures "house" (e.g., FIGS. 13–15) and "volleyball" (FIGS. 16–18). For the "house" picture, both Bradley and Bollman (U.S. Pat. No. 5,978,519) would keep the entire image and not be able to produce a cropped image because of the shadows at the bottom and the tree extending to the top border of the uncropped image (FIG. 13). There are no continuous flat background regions extending from the image borders in this picture, as required by U.S. Pat. No. 5,978,519. Similarly, the top of the tree in FIG. 16, would not be cropped in the system disclosed in U.S. Pat. No. 5,978,519.

Secondary subjects can lead to a more balanced cropped picture. For the "volleyball" picture (FIG. 16), the inclusion of some parts of the tree by the algorithm leads to more interesting cropped pictures than simply placing the main subjects (players) in the center of the cropped image (FIG. 18). The invention was able to do so because the trees are indicated to be of secondary importance based on the belief map. It is obvious that the art taught by Bradley and Bollman in U.S. Pat. No. 5,978,519 would not be able to produce such a nicely cropped image. In fact, both Bradley and Bollman (U.S. Pat. No. 5,978,519) would at best remove the lower lawn portion of the picture and keep the tree branches in the upper-left of the uncropped image (FIG. 18).

Figure 12:
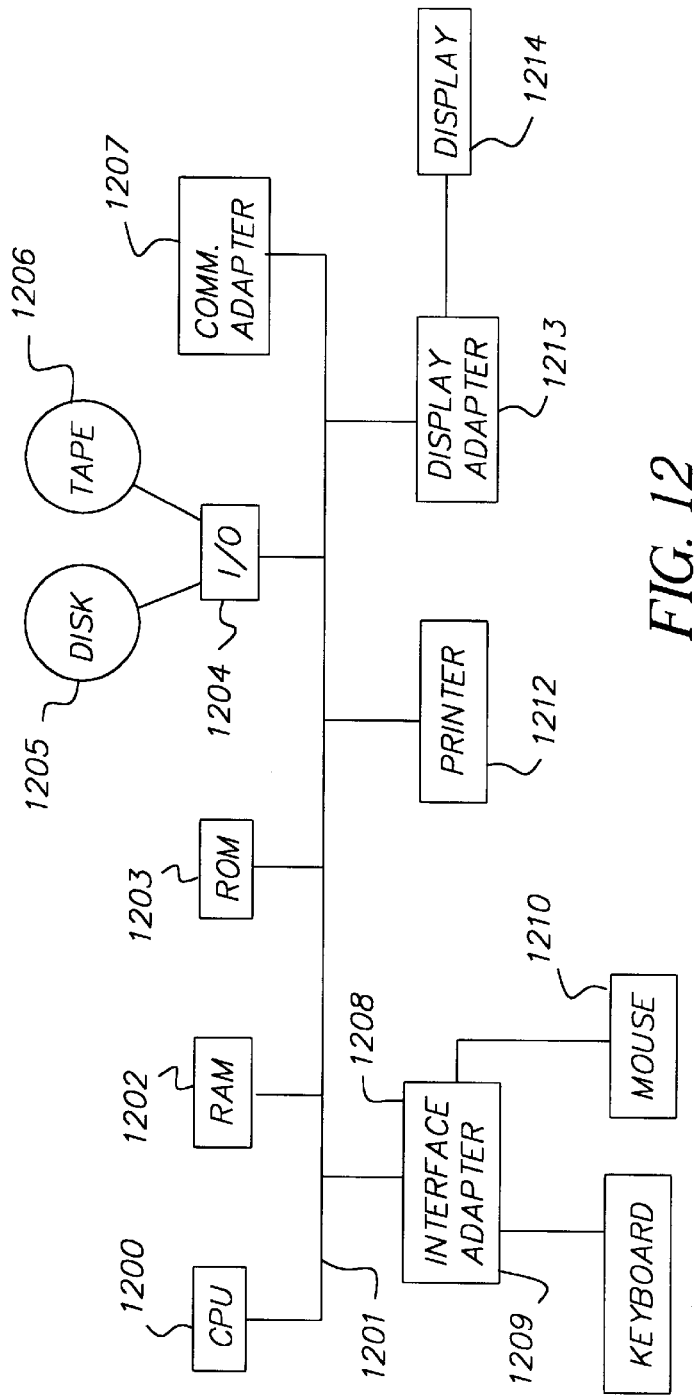
FIG. 12 is a system embodiment of the invention.

While the overall methodology of the invention is described above, the invention can be embodied in any number of different types of systems and executed in any number of different ways, as would be known by one ordinarily skilled in the art. For example, as illustrated in FIG. 12, a typical hardware configuration of an information handling/computer system in accordance with the invention preferably has at least one processor or central processing unit (CPU) 1200. For example, the central processing unit 1200 could include various image/texture processing units, mapping units, weighting units, adders, subtractors, comparators, selectors, window movers, croppers, etc. Alternatively, as would be known by one ordinarily skilled in the art given this disclosure, multiple specialized CPU's (or other similar individual functional units) could perform the same processing, mapping, weighting, adding, subtracting, comparing, etc.

The CPU 1200 is interconnected via a system bus 1201 to a random access memory (RAM) 1202, read-only memory (ROM) 1203, input/output (I/O) adapter 1204 (for connecting peripheral devices such as disk units 1205 and tape drives 1206 to the bus 1201), communication adapter 1207 (for connecting an information handling system to a data processing network) user interface adapter 1208 (for connecting a peripherals 1209, 1210 such as a keyboard, mouse, microphone speaker and/or other user interface device to the bus 1201), a printer 1212, and display adapter 1213 (for connecting the bus 1201 to a display device 1214). The invention could be implemented using the structure shown in FIG. 12 by including the inventive method within a computer program stored on the storage device 1205. Such a computer program would act on information supplied through the interface units 1209, 1210 or through the network connection 1207. The system would then automatically produce the final desired product on the display 1214, through the printer 1212 or back to the network 1207.

While the invention has been described in terms of preferred embodiments, those skilled in the art will recognize that the invention can be practiced with modification within the spirit and scope of the appended claims.

What is claimed is:

1. A method of cropping a digital image comprising:
   inputting a belief map of a photographic image, said belief map comprising a plurality of belief values, each belief value at each location in said belief map indicating an importance of a photographic subject at said location, wherein a photographic subject having a highest belief value comprises a main subject;
   selecting a crop window having a shape and a zoom factor, said shape and zoom factor determining a size of said crop window;
   positioning said crop window such that said crop window is centered at a center-of-mass of said main subject;
   moving said crop window such that said crop window is completely within said image;
   moving said crop window such that a sum of belief values of said crop window is at a maximum; and
   cropping said image according to said crop window.

2. The method in claim 1, further comprising moving said crop window such that said crop window includes all of at least one main subject.

3. The method in claim 2, further comprising moving said crop window to include a buffer around said main subject.

4. The method in claim 1, further comprising clustering regions of said belief map to identify background subjects and secondary subjects.

5. The method in claim 4, wherein said clustering includes setting said background portions to a zero belief value.

6. The method in claim 1, further comprising repeating said moving processes with a rotated image and determining if said rotated image produces a higher sum of belief values.

7. The method in claim 6, further comprising repeating said positioning process and said moving processes with said rotated image and determining if said rotated image produces a higher sum of belief values.

8. The method in claim 1, further comprising repeating said processes with a second zoom factor and a second crop window and determining if said second zoom factor and said second crop window produces a higher sum of belief values.

9. A method of cropping an image comprising:
   inputting a belief map of a photographic image, said belief map comprising a plurality of belief values, each belief value at each location in said belief map indicating an importance of a photographic subject at said location wherein a photographic subject having a highest belief value comprises a main subject;
   selecting a crop window;
   positioning said crop window such that said crop window is centered around said main subject; and
   cropping said image according to said crop window.

10. The method in claim 9, further comprising selecting a zoom factor in order to determine a size of said crop window.

11. The method in claim 10, wherein said zoom factor is selected according to a size of said main subject.

12. The method in claim 9, further comprising clustering regions of said belief map into belief categories.

13. The method in claim 12, wherein said clustering includes setting portions of said belief map having a lowest belief value to a zero belief value.

14. The method in claim 9, further comprising moving said crop window such that said crop window is completely within said image.

15. The method in claim 9, further comprising moving said crop window such that a sum of belief values of said crop window is at a maximum.

16. The method in claim 9, further comprising moving said crop window such that said crop window includes all of said main subject.

17. The method in claim 9, further comprising moving said crop window to include a buffer around said main subject.

18. The method in claim 9, further comprising repeating said moving processes with a rotated image and determining if said rotated image produces a higher sum of belief values.

19. The method in claim 9, further comprising repeating said positioning process and said moving processes with a rotated image and determining if said rotated image produces a higher sum of belief values.

20. The method in claim 9, further comprising repeating said processes with a second crop window and determining if said second crop window produces a higher sum of belief values.

21. A method of using a computer program operating on a computer to crop an image comprising:

using said computer program to input a belief map of a photographic image, said belief map comprising a plurality of belief values, each belief value at each location in said belief map indicating an importance of a photographic subject at said location, wherein a photographic subject having a highest belief value comprises a main subject;

using said computer program to select a crop window;

using said computer program to position said crop window such that said crop window is centered around said main subject; and using said computer program to crop said image according to said crop window.

22. The method in claim 21, further comprising using said computer program to select a zoom factor.

23. The method in claim 21, further comprising using said computer program to cluster regions of said belief map into belief categories.

24. The method in claim 23, wherein said using said computer program to cluster includes using said computer program to set portions of said belief map having a lowest belief value to a zero belief value.

25. The method in claim 21, further comprising using said computer program to move said crop window such that said crop window is included completely within said image.

26. The method in claim 21, further comprising using said computer program to move said crop window such that a sum of belief values is at a maximum.

27. The method in claim 21, further comprising using said computer program to move said crop window such that said crop window includes all of said main subject.

28. The method in claim 21, further comprising using said computer program to move said crop window to include a buffer around said main subject.

29. The method in claim 21, further comprising using said computer program to repeat said move processes with a rotated image and using said computer program to determine if said rotated image produces a higher sum of belief values.

30. The method in claim 21, further comprising using said computer program to repeat said position process and said move processes with a rotated image and using said computer program to determine if said rotated image produces a higher sum of belief values.

31. The method in claim 21, further comprising using said computer program to repeat said processes with a second crop window and using said computer program to determine if said second crop window produces a higher sum of belief values.

32. A system for cropping images comprising:

an input receiving a belief map of a photographic image, said belief map comprising a plurality of belief values, each belief value at each location in said belief map indicating an importance of a photographic subject at said location, wherein a photographic subject having a highest belief value comprises a main subject;

a selector choosing a crop window;

a window mover positioning said crop window such that said crop window is centered around said main subject; and a cropper modifying said image according to said crop window.

33. The system in claim 32, further comprising a second selector selecting a zoom factor.

34. The system in claim 32, further comprising a comparator clustering regions of said belief map into belief categories.

35. The system in claim 34, wherein said comparator sets portions of said belief map having a lowest belief value to a zero belief value.

36. The system in claim 32, wherein said window mover moves said crop window such that said crop window is completely within said image.

37. The system in claim 32, wherein said window mover moves said crop window such that a sum of belief values is at a maximum.

38. The system in claim 32, wherein said window mover moves said crop window such that said crop window includes all of said main subject.

39. The system in claim 32, wherein said window mover moves said crop window to include a buffer around said main subject.

40. The system in claim 32, wherein said window mover repeats said moving processes with a rotated image and determines if said rotated image produces a higher sum of belief values.

41. The system in claim 32, wherein said window mover repeats said positioning process and said moving processes with a rotated image and determines if said rotated image produces a higher sum of belief values.

42. The system in claim 32, wherein said selector, window mover and cropper repeat said processes with a second crop window and determine if said second crop window produces a higher sum of belief values.

43. A method of cropping a digital image having pixels to produce a cropped digital image, comprising:

developing a belief map of a photographic image by using such pixels to determine a series of features and using such features to assign a probability of a location of a main subject of the digital image in the belief map; and cropping the digital image to include main subjects indicated by the belief map to produce the cropped digital image.

44. A method of cropping a digital image having pixels to produce a cropped digital image, comprising:
   a) developing a belief map of a photographic image by using such pixels to determine a series of features and using such features to assign a probability of a location of a main subject of the digital image in the belief map; and
   b) cropping the digital image to include main subjects indicated by the belief map to produce the cropped digital image by:
      i) selecting a crop window having a shape and a zoom factor, said shape and zoom factor determining a size of said crop window;
      ii) moving the cropped window to a plurality of positions and using the belief map values to select the position which has a high probability of subject content; and
      iii) cropping the digital image at the high probability subject content position to produce the cropped digital image.

45. A method of cropping a digital image having pixels to produce a cropped digital image, comprising:
   a) developing a belief map of a photographic image by using such pixels to determine a series of features and using such features to assign a probability of a location of a main subject of the digital image in the belief map;
   b) using the belief map to determine a center of a mass of the belief map;
   c) positioning a crop window at a location which includes the center of the mass; and
   d) cropping the digital image to include main subjects indicated by the belief map to produce the cropped digital image by:
      i) selecting the crop window to have a shape and a zoom factor, said shape and zoom factor determining a size of said crop window;
      ii) moving the cropped window to positions and using the belief map values to select the position which has a high probability of subject content; and
      iii) cropping the digital image at the high probability subject content position to produce the cropped digital image.

46. The method of claim 45 wherein the crop window is completely within the digital image.

47. A method of cropping a digital image having pixels to produce a cropped digital image, comprising:
   a) developing a belief map of a photographic image by using such pixels to determine a series of features and using such features to assign a probability of a location of a main subject of the digital image in the belief map;
   b) performing a clustering of the belief map to identify at least a cluster of highest belief values corresponding to main subject, a cluster of intermediate belief values corresponding to secondary subjects, and a cluster of lowest belief values corresponding to the background;
   c) using the belief map to determine the center of the mass of the belief map;
   d) positioning a cropped window at a location which includes the center of mass; and
   e) cropping the digital image to include at least the main subject found in step b) to produce the cropped digital image by:
      i) selecting the crop window to have a shape and a zoom factor, said shape and zoom factor determining a size of said crop window;
      ii) moving the cropped window to a plurality of positions and using the belief map values to select the position which has a high probability of subject content; and
      iii) cropping the digital image at the high probability subject content position to produce the cropped digital image.

48. The method of claim 47 wherein the crop window is completely within the digital image.

* * * * *